(12) United States Patent
Jeong et al.

(10) Patent No.: US 9,388,287 B2
(45) Date of Patent: *Jul. 12, 2016

(54) POLYIMIDE FILM

(75) Inventors: Young Han Jeong, Daegu (KR); Hyo Jun Park, Gyeonggi-do (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 23 days.

This patent is subject to a terminal disclaimer.

(21) Appl. No.: 13/638,660

(22) PCT Filed: Mar. 30, 2011

(86) PCT No.: PCT/KR2011/002172
§ 371 (c)(1),
(2), (4) Date: Oct. 23, 2012

(87) PCT Pub. No.: WO2011/122842
PCT Pub. Date: Oct. 6, 2011

(65) Prior Publication Data
US 2013/0035447 A1    Feb. 7, 2013

(30) Foreign Application Priority Data
Mar. 30, 2010   (KR) ........................ 10-2010-0028369

(51) Int. Cl.
*C08J 5/18* (2006.01)
*C09J 179/08* (2006.01)
*C08G 73/10* (2006.01)
*C08L 79/08* (2006.01)

(52) U.S. Cl.
CPC ............... *C08J 5/18* (2013.01); *C08G 73/1039* (2013.01); *C08G 73/1042* (2013.01); *C08G 73/1067* (2013.01); *C08L 79/08* (2013.01); *C09J 179/08* (2013.01); *C08J 2379/08* (2013.01)

(58) Field of Classification Search
CPC .............. C09J 179/08; C08G 73/1042; C08G 73/1067; G02F 1/133723; C09D 179/08; G03F 7/0387; C08J 2379/08; C08L 83/04; C08L 79/08
See application file for complete search history.

(56) References Cited

U.S. PATENT DOCUMENTS

| 4,912,197 | A | 3/1990 | Hayes | |
| 8,846,852 | B2 * | 9/2014 | Jeong | C08G 73/1039 428/1.26 |
| 2005/0221023 | A1 * | 10/2005 | Sakamoto et al. | 428/1.3 |
| 2009/0252957 | A1 | 10/2009 | Kasumi et al. | |
| 2011/0245455 | A1 | 10/2011 | Jeong et al. | |
| 2011/0311796 | A1 * | 12/2011 | Jung et al. | 428/220 |

FOREIGN PATENT DOCUMENTS

| JP | 2007-162005 A | | 6/2007 |
| KR | 20090019306 | * | 2/2009 |
| KR | 10-2010-0023451 A | | 3/2010 |
| KR | 10-2011-0108894 A | | 10/2011 |
| WO | 2008/004496 A1 | | 1/2008 |

OTHER PUBLICATIONS

International Searching Authority, International Search Report of PCT/KR2011/002172 dated Dec. 27, 2012.

* cited by examiner

*Primary Examiner* — Gregory Listvoyb
(74) *Attorney, Agent, or Firm* — Sughrue Mion, PLLC

(57) ABSTRACT

The present invention provides a polyimide film having a good transparency and also an excellent thermal resistance so that it is useful in a transparent conductive film, TFT substrate, a flexible printing circuit substrate, and the like.

20 Claims, No Drawings

POLYIMIDE FILM

TECHNICAL FIELD

The present invention relates to a polyimide film, which is a colorless and transparent, and has an excellent thermal resistance.

BACKGROUND ART

Polyimide resin is insoluble and infusible resin that has a super high thermal resistance, and has excellent properties, such as a thermally-oxidation resistance, a thermal resistance property, a radiation resistance, a low temperature property, a chemical resistance, and the like. Therefore, the polyimide resin is being used in wide fields, such as thermal resistance state-of-the-art materials, for example materials for automobile, materials for flight, materials for spacecraft, and the like, and electronic materials, for example an insulation coating, an insulation film, a semiconductor, an electrode protective film of TFT-LCD, and the like, and also is being recently used in a transparent electrode film, and the like by coating on a surface or containing a conductive filler in a film and display material, such as an optical fiber or a liquid crystal alignment film.

However, a general polyimide resin has turned brown or yellow due to high density of aromatic ring so that it has low transmittance in a visible ray region and is a color that is associated with yellow so that makes optical transmittance to be decreased. Therefore, the general polyimide resin is difficult to use in the field that needs transparency.

Therefore, various efforts are being performed in order to improve a color and transmittance of a general polyimide film, but the thermal resistance seems to be decreased in proportion to the improvement of the color and the transmittance of the film.

In addition, the supply of a transparent film having high thermal resistance is required in addition to a diversification of the function in the use for various electric-electronic materials that are applied with the polyimide film.

DISCLOSURE

Technical Problem

The present invention is to provide a polyimide film having an excellent thermal resistance as well as a satisfactory transparency.

An embodiment according to the present invention provides a polyimide powder having a specific refractive index increment (dn/dc) of 0.100 to 0.1800, and an imidization degree of not less than 80%, in which the polyimide powder is an imide of polyamic acid that is obtained from the polymerization of a diamine and an acid dianhydride, and the specific refractive index increment (dn/dc) is defined as follows:

Specific refractive index increment (dn/dc): the value is that a change rate of refractive index according to the change rate of dilute solution concentration is differentiated and is measured within the range of 0.001 to 0.1 g/ml that is a section of concentration change when detecting a refractive index through injecting the polyimide powder in a state of dilute solution in an organic solvent inside flow cell of differential refractometer.

The polyimide powder according to a preferable embodiment may have a specific refractive index increment (dn/dc) of 0.100 to 0.1300.

For the polyimide powder according an embodiment of the present invention, the acid dianhydride may include 2,2-bis (3,4-dicarboxyphenyl)hexafluoropropane dianhydride. At this time, 2,2-bis(3,4-dicarboxyphenyl)hexafluoropropane dianhydride may be preferably included in 30 mol % to 100 mol % in the acid dianhydride.

For the polyimide powder according an embodiment of the present invention, the diamine may include 2,2'-bis(trifluoromethyl)-4,4'-diaminobiphenyl.

At this time, 2,2'-bis(trifluoromethyl)-4,4'-diaminobiphenyl may be preferably included in 20 mol % to 100 mol % in the diamine.

For the polyimide powder according to an embodiment of the present invention, the imide of the polyamic acid may be obtained by firstly injecting 2,2-bis(3,4-dicarboxyphenyl) hexafluoropropane dianhydride in the acid anhydride when polymerizing.

For the polyimide powder according to another embodiment, the imide of the polyamic acid may be obtained by finally injecting 2,2-bis(3,4-dicarboxyphenyl)hexafluoropropane dianhydride in the acid anhydride when polymerizing.

For the polyimide powder according to an embodiment of the present invention, the polymerization may be performed for 1 to 24 hours, and preferably for 8 to 12 hours.

An embodiment according to the present invention provides a method for producing the polyimide powder having the imidization degree of not less than 80% and the specific refractive index increment (dn/dc) of 0.100 to 0.1300, comprising obtaining the solution of the polyamic acid by polymerizing the diamine and the acid dianhydride in an organic solvent; preparing the solution containing the imide that is imidized in an imidization degree of not less than 80% by injecting a chemical converting agent to the solution of the polyamic acid; precipitating by adding a solvent selected from the group consisting of water, methyl alcohol, ethyl alcohol, isopropyl alcohol, ethylene glycol, triethylene glycol, 2-butyl alcohol, 2-propyl alcohol, 2-hexyl alcohol, cyclophentyl alcohol, cyclohexyl alcohol, phenol and t-butyl alcohol to the solution containing the imide; and filtering of the solids that are precipitated, in which the specific refractive index increment (dn/dc) is defined as follows:

Specific refractive index increment (dn/dc): the value is that a change rate of refractive index according to the change rate of dilute solution concentration is differentiated and is measured within the range of 0.001 to 0.1 g/ml that is a section of concentration change when detecting a refractive index through injecting the polyimide powder in a state of dilute solution in an organic solvent inside flow cell of differential refractometer.

Another embodiment according to the present invention provides the polyimide film having the specific refractive index increment (dn/dc) of 0.100 to 0.1800, in which the polyimide film is obtained by casting the imide of the polyamic acid that is obtained by polymerizing the diamine and the acid dianhydride, and the specific refractive index increment (dn/dc) is defined as follows:

Specific refractive index increment (dn/dc): the value is that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer.

For the polyimide film according to a preferable embodiment, the specific refractive index increment (dn/dc) may be 0.100 to 0.1300.

For the polyimide film according to an embodiment of the present invention, the acid dianhydride may include 2,2-bis(3,4-dicarboxyphenyl)hexafluoropropane dianhydride. At this time, 2,2-bis(3,4-dicarboxyphenyl)hexafluoropropane dianhydride may be preferably included in 30 mol % to 100 mol % in the acid dianhydride.

For the polyimide film according an embodiment of the present invention, the diamine may include 2,2'-bis(trifluoromethyl)-4,4'-diaminobiphenyl. At this time, 2,2'-bis(trifluoromethyl)-4,4'-diaminobiphenyl may be preferably included in 20 mol % to 100 mol % in the diamine.

The polyimide film according to an embodiment of the present invention may be obtained from the imide of the polyamic acid that is obtained by firstly injecting 2,2-bis(3,4-dicarboxyphenyl)hexafluoropropane dianhydride in the acid anhydride.

The polyimide film according to another embodiment may be obtained from the imide of the polyamic acid that is obtained by finally injecting 2,2-bis(3,4-dicarboxyphenyl)hexafluoropropane dianhydride in the acid anhydride.

For the polyimide film according to an embodiment of the present invention, the polymerization may be performed for 1 to 24 hours, and preferably for 8 to 12 hours.

In addition, the polyimide film according to an embodiment of the present invention may have a degree of yellowness of not more than 4.5 based on the film thickness of 50~100 μm.

In addition, a mean coefficient of linear thermal expansion (CTE) may be not more than 70 ppm/° C., in which the mean coefficient of linear thermal expansion (CTE) is measured within the range of 50 to 250° C. using a thermomechanical analysis based on the film thickness of 50~100 μm.

An embodiment according to the present invention provides a method for producing the polyimide film having the specific refractive index increment (dn/dc) of 0.100 to 0.1800, comprising obtaining the solution of the polyamic acid by polymerizing the diamine and the acid dianhydride in an organic solvent; preparing the solution including the imide that is imidized in an imidization degree of not less than 80% by injecting a chemical converting agent to the solution of the polyamic acid; and precipitating by adding a solvent selected from the group consisting of water, methyl alcohol, ethyl alcohol, isopropyl alcohol, ethylene glycol, triethylene glycol, 2-butyl alcohol, 2-propyl alcohol, 2-hexyl alcohol, cyclophentyl alcohol, cyclohexyl alcohol, phenol and t-butyl alcohol to the solution containing the imide, in which the specific refractive index increment (dn/dc) is defined as follows:

Specific refractive index increment (dn/dc): the value is that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer.

The polyimide film according to an embodiment of the present invention may have the specific refractive index increment (dn/dc) of 0.100 to 0.1300.

For the method for producing the polyimide film according to an embodiment of the present invention, the chemical converting agent may include a dehydrating agent and catalyst.

The polyimide film according to an embodiment of the present invention has a good transparency and also an excellent thermal resistance thereby decreasing the dimensional changes according to the thermal stress so that it expected to be useful in a transparent conductive film, TFT substrate, a flexible printing circuit substrate, and the like.

Technical Solution

Hereinafter, the present invention will be described in more detail as follows:

The polyimide powder according an embodiment of the present invention is the imide of the polyamic acid that is obtained by polymerizing the diamine and the acid dianhydride in term of the satisfied thermal resistance and the secured transparency, in which the imidization degree may be not less than 80% and the specific refractive index increment (dn/dc) that is defined as follows may be 0.100 to 0.1800.

Specific refractive index increment (dn/dc): the value is that a change rate of refractive index according to the change rate of dilute solution concentration is differentiated and is measured within the range of 0.001 to 0.1 g/ml that is a section of concentration change when detecting a refractive index through injecting the polyimide powder in a state of dilute solution in an organic solvent inside flow cell of differential refractometer.

Example of a method for measuring an absolute molecular weight for the measurement of the molecular weight of polymer may include a method for measuring the absolute molecular weight using a light scattering in a polymer solution.

The light scattering is occurred through a polymer chain in the polymer solution because the size of polymer coil is smaller than the wavelength of light or similar to the wavelength of light and also the polymer chain is polarized by an electric field of incident light. The degree of scattering is not proportional to the amount of material that generates the scattering and the scattering due to larger particles is too strong as compared to the scattering due to smaller particles when the scatterer is present in a same amount. Therefore, the scattering degree of light is affected by the size of particle so that the information about the molecular weight of polymer can be obtained when using the scattering degree of light. In addition, when light is passed through the dilute polymer solution, of which the refractive index of solvent is different from the refractive index of polymer that is dissolved in the solvent, light will be scattered according to the strength that is depended to the size and concentration of polymer that is dissolved in addition to the difference between the refractive indexes of the polymer and the solvent. If the polymer solution is the sufficient dilute solution, the strength of scattered light will be indicated in the total level of contribution for scattering that is generated by each polymer coil that is well separated in a solution. The reason is that the strength of light that is scattered by each polymer coil in any direction is proportional to a square of vector size of light wave that is scattered when the size of the dissolved polymer coils is isotropy if it is very smaller than the wavelength of light or same polarity in all the directions.

For calculating the information about the molecular weight by the above light scattering, a constant of the refractive index value according to the concentration of each polymer should be firstly determined; and the constant of the refractive index value according to the concentration is the value involved in the mole ratio of monomers composing the acid dianhydride that is used for polymerizing a polyimide precursor, and is relevant to the intrinsic value of the material.

However, for the polyimide powder or the polyimide film, the preparation of the sample according to the concentration is generally difficult by dissolving the sample in an organic solvent, and also the measurement of the refractive index is difficult because the polymer solution is not easily prepared due to many aromatic rings. When many aromatic rings are presented, the colored polymer is appeared.

In this sense, the polyimide powder having the specific refractive index increment (dn/dc) of 0.100 to 0.180 that is provided according an embodiment of the present invention has a proper molecular weight and molecular weight distribution so that it has good transparency and thermal resistance.

When the specific refractive index increment (dn/dc) of the polyimide powder is less than 0.100, the thermal resistance is decreased; when it exceeds 0.180, the transparency is decreased, so that the above range is preferable when considering the balance between two properties, and preferably the specific refractive index increment (dn/dc) is 0.100 to 0.1300.

In addition, the polyimide powder according to the present invention is good in terms of the storage stability when the imidization degree is not less than 80%. When the imidization degree of the polyimide powder is less than 80%, there may be a problem with the storage stability.

Examples of a method for obtaining the polyimide powder that is satisfied with the imidization degree and the specific refractive index increment (dn/dc) as mentioned above may be depended on the selection of monomer, the control of the monomer content, the polymerization order, a method for polymerizing, and the like, and also may be depended on a precipitation method for obtaining the powder.

For example, the polyimide powder according to an embodiment of the present invention may be obtained from the imidization of the polyamic acid that is obtained by polymerizing the diamine and the acid dianhydride.

Considering the transparency, the acid dianhydride preferably includes 2,2-bis(3,4-dicarboxyphenyl)hexafluoropropane dianhydride (6-FDA). And also, one or more one selected from the group consisting of 4-(2,5-dioxotetrahydrofuran-3)-1,2,3,4-tetrahydronaphtalene-1,2-dicarboxylic anhydride (TDA) and 4,4'-(4,4'-isopropylidenediphenoxy) bis(phthalic anhydride) (HBDA) may further be included. Considering the thermal resistance, more preferably, one or more one selected from the group consisting of pyromellitic dianhydride (PMDA), biphenyltetracarboxylic dianhydride (BPDA) and oxydiphthalic dianhydride (ODPA) may be used jointly.

The use amount of 6-FDA in the acid dianhydride may be preferably 30 to 100 mol % in terms of the expression of the transparency while not inhibiting other properties, for example, the thermal resistance, and the like.

Meanwhile, examples of the diamine may include one or more one selected from the group consisting of 2,2-bis[4-(4-aminophenoxy)-phenyl]propane (6HMDA), 2,2'-bis(trifluoromethyl)-4,4'-diaminobiphenyl (2,2'-TFDB), 3,3'-bis(trifluoromethyl)-4,4'-diaminophenyl (3,3'-TFDB), 4,4'-bis(3-aminophenoxy)diphenylsulfone (DBSDA), bis(3-aminophenyl)sulfone (3DDS), bis(4-aminophenyl)sulfone (4DDS), 1,3-bis(3-aminophenoxy)benzene (APB-133), 1,4-bis(4-aminophenoxy)benzene (APB-134), 2,2'-bis[3(3-aminophenoxy)phenyl]hexafluoropropane (3-BDAF), 2,2'-bis[4 (4-aminophenoxy)phenyl]hexafluoropropane (4-BDAF), 2,2'-bis(3-aminophenyl)hexafluoropropane (3,3'-6F), 2,2'-bis(4-aminophenyl)hexafluoropropane (4,4'-6F) and oxydianiline (ODA), and 2,2'-TFDB in the diamines may be preferably included in terms of the proper free volume secured by the side chain.

More preferably, 2,2'-TFDB in total diamines may be included in 20 to 100 mol % in terms of the maintenance of the transparency through the free volume secured by the side chain.

The solution of the polyamic acid is prepared by dissolving and reacting the equimolar amount of the above acid dianhydride component and the diamine component in a solvent.

The reaction conditions are not limited specifically, but the temperature of the reaction is preferably −20~80° C.; and the time for polymerizing is 1 to 24 hours and preferably 8 to 12 hours. In addition, an inert atmosphere, such as argon, nitrogen, and the like is more preferable when reacting.

Examples of the solvent (hereinafter, called as a first solvent) for polymerizing the solution of the above monomers are not limited specifically if a solvent is possible to dissolve the polyamic acid. One or more polar solvent selected from the group consisting of m-cresol, n-methyl-2-pyrrolidone (NMP), dimethylformamide (DMF), dimethylacetamide (DMAc), dimethylsulfoxide (DMSO), acetone, diethylacetate is used as the known reaction solvent. Above this, a low boiling point solution, such as tetrahydrofuran (THF) and chloroform, and a low absorbency solvent, such as γ-butyrolactone may be used.

The content of the first solvent is not limited specifically, but the content of the first solvent is preferably 50~95 wt %, and more preferably 70~90 wt % in total solution of the polyamic acid in order to obtain the proper molecular weight and the proper viscosity of the solution of the polyamic acid.

A method for preparing the polyimide powder by using the above monomers is not limited specifically, but examples thereof may include a method for obtaining the solid of the polyimide resin, including obtaining the solution of the polyamic acid by polymerizing the diamine and the acid dianhydride under the first solvent; preparing the solution containing the imide by imidizing the solution of the polyamic acid obtained from the above step; precipitating by adding a second solvent to the solution containing the imide; and filtering and drying the solid precipitated in the above step.

At this time, the polarity of the second solvent may be lower than that of the first solvent because it is the solvent for precipitating the resin solid.

Examples thereof may include water, methyl alcohol, ethyl alcohol, isopropyl alcohol, ethylene glycol, triethylene glycol, 2-butyl alcohol, 2-propyl alcohol, 2-hexyl alcohol, cyclophentyl alcohol, cyclohexyl alcohol, phenol, t-butyl alcohol, and the like.

Meanwhile, the thermal resistance of the polyimide can be ultimately controlled by controlling the injection order of monomers, and for example, it may be preferable that 6-FDA in the acid dianhydride is finally injected for polymerizing so that the molecular weight can be increased the polyimide powder having more higher absolute molecular weight can be obtained for the same time of the polymerization as compared to the case of firstly injecting. Consequentially, the thermal resistance of film can be controlled by controlling the injection order of monomers so that the thermal resistance can be more improved in the case of the polyimide powder having large absolute molecular weight.

In addition, the thermal resistance of film can be controlled according to the time of the polymerization so that if the time of the polymerization is increased, the value of the absolute molecular weight can be increased. However, over certain time of the polymerization, the value of the absolute molecular weight is again decreased so that when the time of the polymerization is excessively long, the absolute molecular weight will be decreased due to a depolymerization.

Therefore, when the time of the polymerization is excessively long, the thermal stability (CTE) may be deteriorated due to the decrease of the molecular weight, while when the time of the polymerization is excessively short, the distribution of the molecular weight (PDI) is excessively becoming wider so that the mechanical property of film can be appeared. Therefore, the time of the polymerization may be preferably 1 to 24 hours, and more preferably 8 to 12 hours thereby having the proper absolute molecular weight and the absolute molecular weight distribution so that the polyimide powder that is evenly satisfied with the thermal resistance and the transparency can be obtained.

When imidizing through injecting the chemical converting agent to the solution of the polyamic acid, the imidization degree may be not less than 80%, and preferably not less than 85% in terms of optical and mechanical property, and thermal resistance.

For the condition for drying after filtering the solid of polyimide resin obtained, preferably the temperature is 50~120° C. and the time is 3~24 hours considering the boiling point of the second solvent.

Meanwhile, another embodiment according to the present invention provides the polyimide film having the specific refractive index increment (dn/dc) of 0.100 to 0.1800, in which the polyimide film is obtained by casting the imide of the polyamic acid that is obtained by polymerizing the diamine and the acid dianhydride and the specific refractive index increment (dn/dc) is defined as follows:

Specific refractive index increment (dn/dc): the value is that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer.

As mentioned above, in the case of the polyimide film, the measurement of the change of the refractive index value according to the concentration is generally difficult due to the light scattering because the polymer solution may be not easily prepared due to many aromatic rings. When many aromatic rings are presented, the colored polyimide film is appeared.

In this sense, the polyimide film having the specific refractive index increment (dn/dc) of 0.100 to 0.180 that is provided according an embodiment of the present invention has good transparency and thermal resistance. More preferably, the polyimide film having 0.100 to 0.1300 of the specific refractive index increment (dn/dc) may be preferable in terms of the transparency and thermal resistance.

When the specific refractive index increment (dn/dc) of the polyimide film is less than 0.100, the thermal resistance is decreased; when it exceeds 0.180, the transparency is decreased, so that the above range is preferable when considering the balance between two properties, and preferably the specific refractive index increment (dn/dc) is 0.100 to 0.1300.

In addition, the polyimide film according to the present invention is good in terms of the optical and mechanical property and the thermal resistance when the imidization degree is not less than 95%.

When the imidization degree of the polyimide film is less than 95%, there may be a problem with the optical and mechanical property and the thermal resistance.

Examples of a method for obtaining the polyimide film that is satisfied with the imidization degree and the specific refractive index increment (dn/dc) as mentioned above may include the selection of monomer, the component ratio of the monomers, the control of the polymerization order and a method for polymerizing, the selection of the precipitation methods for obtaining the powder, and the like as detailed mentioned in the above paragraph of the polyimide powder. The relevant detailed description will be omitted in here.

The method for preparing the polyimide film may include preparing the solution of the polyimide by dissolving the polyimide powder obtained from the above method in an organic solvent, casting thereof, and then heating.

At this time, the first solvent may be used as the organic solvent.

The polyimide film may be obtained by casting the solution of the polyimide on the support, and heating for 1 minute~8 hours while gradually increasing the temperature within the range of 40~400° C., and then the heating may be further performed in terms of the increase of the thermal stability and the decrease of the thermal history. The temperature of the further heating is preferably 100~500° C. and the time of the heating is preferably 1 minute~30 minutes.

The remained volatile component of film that is completely heated may be not more than 5%, and preferably not more than 3%.

At this time, the chemical converting agent may be a dehydrating agent that is represented by the acid anhydride, such as acetic anhydride, and the like, and an imidization catalyst that is represented by tertiary amine, such as isoquinoline, -picoline, pyridine, and the like, and the chemical imidization may be preferably used jointly in terms of the decrease of the molecular weight decline.

In addition, the polyimide film according to an embodiment of the present invention may preferably has a degree of yellowness of not more than 4.5 based on the film thickness of 50~100 μm in terms of the securing of the transparency.

In addition, the mean transmittance that is measured at 400 to 740 nm using UV spectrophotometer based on the film thickness of 50~100 μm is preferably not less than 85%. If the mean transmittance that is measured at 400 to 740 nm using UV spectrophotometer based on the film thickness of 50~100 μm is less than 85%, there may be a problem such that the proper visual effect cannot be displayed for using as a usage of display.

In addition, for the polyimide film according to an embodiment of the present invention, preferably the value of L is not less than 90, the value of a is not more than 5 and the value of b is not more than 5 when measuring a color coordinate using UV spectrophotometer based on the film thickness of 50~100 μm, differencing from the general colored polyimide film.

In addition, considering the effect on the dimensional change, the mean coefficient of linear thermal expansion (CTE) of the polyimide film is preferable not more than 70 ppm/° C., in which the mean coefficient of linear thermal expansion (CTE) is measured within the range of 50 to 250° C. using the thermomechanical analysis based on the film thickness of 50–100 μm. If the coefficient of linear thermal expansion is larger than the above value, it may lead to the dimensional change because the coefficient of linear thermal expansion is excessively becoming large and the difference with the coefficient of linear thermal expansion of a metal foil is becoming large when preparing an adhesive film.

Preferably, the mean coefficient of linear thermal expansion (CTE) may be 15 ppm/° C. to 60 ppm/° C.

BEST MODE

Hereinafter, the embodiments of the present invention will be described in detail as follows, but the present invention will not be limited thereto.

EXAMPLE 1

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 71.08 g (0.16 mol) of 6FDA was added and stirred for 1 hour to completely dissolve 6FDA. At this time, the temperature of the solution was maintained at 25° C. And, 11.76 g (0.04 mol) of BPDA was added and then the solution of the polyamic acid having the solid concentration of 20 wt % was obtained.

The solution of the polyamic acid was stirred at a room temperature for 12 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 120 g of the solid powder (the degree of imidization was 28%).

EXAMPLE 2

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 3 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 90 g of the solid powder (the degree of imidization was 80%).

EXAMPLE 3

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 12 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 126 g of the solid powder (the degree of imidization was 82%).

EXAMPLE 4

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 24 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 125 g of the solid powder (the degree of imidization was 83%).

The data about the polymer was collected using the following method about the polyimide powders that were obtained from the above Example 1 to Example 4.

(1) Apparatus and Method for Analyzing

GPC & MALS Analysis Apparatus: GPC—Water 1525 Binary HPLC pump; RI detector—Wyatt optilab rEX; MALS—Wyatt Dawn 8+; Column—µ—Styragel HT Linear (7.8*300 mm) 2EA, Styragel HT 6E (2) Pretreatment Method of Sample 0.05 g of the powders that were obtained from the above Example 1 to Example 4 were weighted and dissolved in 10 ml of DMF (containing 0.05% LiCl). The solutions of DMF containing the powder were added to an oven of 50° C. and dissolved for 2 hours while shaking. After completely dissolving the sample, it was filtered with 0.45 µm syringe filter and then installed to MALS autosampler.

(3) Analysis Method

Injection volume: 400 µl

Injection Temp.: 50° C.

Flow Rate: 1 ml/min

Eluent: DMF (containing 0.05% LiCl): Refractive index 1.405

Column Temp.: 50° C.

Dn/Dc: see the following description

At this time, Dn/Dc relates to the specific refractive index increment, and is the value that a change rate of refractive index according to the change rate of dilute solution concentration is differentiated and is measured within the range of 0.001 to 0.1 g/ml that is a section of concentration change when detecting a refractive index through injecting the polyimide powder in a state of dilute solution in an organic solvent inside flow cell of differential refractometer. Specifically, the above value was measured as the following method.

(4) Analysis Apparatus that is used for Measuring Dn/Dc

RI Detector: Wyatt Optilavb rEX (5) Pretreatment Method of Sample for Measuring Dn/Dc Firstly, 0.2 g of the polyimide powders that were obtained from the above Example 1 to Example 4 were dissolved in 500 of DMF (containing 0.05% LiCl) to prepare a sample of high concentration. At this time, because it was not easily dissolved, it was added to an oven of 50° C., and dissolved for about 2 hours while shaking. The samples having 0.0032 g/ml, 0.0024 g/ml, 0.0016 g/ml and 0.0008 g/ml concentration, respectively were prepared by diluting the sample having a high concentration. For each sample, the refractive index values according to the concentration were measured using 0.45 μm syringe filter.

(6) Analysis Method of Dn/Dc Sample
injection volume: 10 ml
injector Temp.: 50° C.
flow rate: 16 ml/hr
eluent: DMF (containing 0.05% LiCl) % LiCl)

As the results obtained from the above analysis, in the case of the polyimide powders that were obtained from the above Example 1 to Example 4, Dn/Dc value was 0.1180 at 50° C. of DMF (containing 0.05% LiCl).

The absolute molecular weight value according to MALS can be calculated according to the above method from Dn/Dc value that was obtained. The results were shown in the following Table 1.

TABLE 1

|  | Dn/Dc | Mn (g/mol) | Mp (g/mol) | Mw (g/mol) | Mz (g/mol) | Rz (nm) | Polydispesity |
|---|---|---|---|---|---|---|---|
| Example 1 | 0.1180 | $5.004 \times 10^4$ | $7.513 \times 10^4$ | $5.655 \times 10^4$ | $6.132 \times 10^4$ | 9.9 | 1.130 |
| Example 2 | 0.1180 | $3.407 \times 10^4$ | $4.446 \times 10^4$ | $4.241 \times 10^4$ | $5.511 \times 10^4$ | 14.6 | 1.245 |
| Example 3 | 0.1180 | $1.138 \times 10^5$ | $1.438 \times 10^5$ | $1.385 \times 10^5$ | $1.810 \times 10^5$ | 24.0 | 1.217 |
| Example 4 | 0.1180 | $7.564 \times 10^4$ | $1.120 \times 10^5$ | $8.727 \times 10^4$ | $9.496 \times 10^4$ | 14.8 | 1.153 |

EXAMPLE 5

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 71.08 g (0.16 mol) of 6FDA was added and stirred for 1 hour to completely dissolve 6FDA. At this time, the temperature of the solution was maintained at 25° C. And, 11.76 g (0.04 mol) of BPDA was added and then the solution of the polyamic acid having the solid concentration of 20 wt % was obtained.

The solution of the polyamic acid was stirred at a room temperature for 3 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 120 g of the solid powder (the degree of imidization was 80%).

The solid powder obtained from the above method was dissolved in 480 g of N,N-dimethylacetamide (DMAc) to obtain 20 wt % of the solution (viscosity: 70 poise).

After finishing the reaction, the obtained solution was applied to a stainless board and then cast in 700 μm; after drying for 1 hour with a hot-air of 150° C., the film was detached from the stainless board and then fixed in a frame with a pin.

After the frame fixed with the film was added to the vacuum oven and slowly heated for 2 hours from 100° C. to 300° C., it was slowly cooled to remove from the frame to obtain the polyimide film. And then, it was again heated for 30 minutes at 300° C. to obtain the polyimide film as the final heating (thickness: 100 μm, and the degree of imidization: 95%).

EXAMPLE 6 TO EXAMPLE 8

The polyimide film was obtained using the same method to the above Example 5, but the reaction time was changed to 5, 12 and 24 hours, respectively when preparing the solution of the polyamic acid.

EXAMPLE 9

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 3 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 90 g of the solid powder (the degree of imidization was 80%).

The solid powder obtained from the above method was dissolved in 360 g of N,N-dimethylacetamide (DMAc) to obtain 20 wt % of the solution (viscosity: 70 poise).

After finishing the reaction, the obtained solution was applied to a stainless board and then cast in 700 μm; after drying for 1 hour with a hot-air of 150° C., the film was detached from the stainless board and then fixed in a frame with a pin.

After the frame fixed with the film was added to the vacuum oven and slowly heated for 2 hours from 100° C. to 300° C., it was slowly cooled to remove from the frame to obtain the polyimide film. And then, it was again heated for 30 minutes at 300° C. to obtain the polyimide film as the final heating (thickness: 100 μm, and the degree of imidization: 95%).

EXAMPLE 10 AND EXAMPLE 11

The polyimide film was obtained using the same method to the above Example 9, but the reaction time was changed to 12 and 24 hours, respectively when preparing the solution of the polyamic acid.

EXAMPLE 12

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 12 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of water to precipitate; the precipitated solid was filtered and grinded; and then dried at 80° C. in vacuum for 6 hours to obtain 123 g of the solid powder (the degree of imidization was 81%).

The solid powder obtained from the above method was dissolved in 492 g of N,N-dimethylacetamide (DMAc) to obtain 20 wt % of the solution (viscosity: 70 poise).

After finishing the reaction, the obtained solution was applied to a stainless board and then cast in 700 μm; after drying for 1 hour with a hot-air of 150° C., the film was detached from the stainless board and then fixed in a frame with a pin.

After the frame fixed with the film was added to the vacuum oven and slowly heated for 2 hours from 100° C. to 300° C., it was slowly cooled to remove from the frame to obtain the polyimide film. And then, it was again heated for 30 minutes at 300° C. to obtain the polyimide film as the final heating (thickness: 100 μm, and the degree of imidization: 95%).

The data about the polymer was collected using the following method about the polyimide films that were obtained from the above Example 5 to Example 12.

(1) Apparatus and Method for Analyzing

GPC & MALS Analysis Apparatus: GPC—Water 1525 Binary HPLC pump; RI detector—Wyatt optilab rEX; MALS—Wyatt Dawn 8+; Column—μ—Styragel HT Linear (7.8*300 mm) 2EA, Styragel HT 6E (2) Pretreatment Method of Sample 0.05 g of the films that were obtained from the above Example 5 to Example 12 was weighted and 10 ml of DMF (containing 0.05% LiCl) was added in the vial. The solutions of DMF containing the films were added to an oven of 50° C. and dissolved for 2 hours while shaking. After completely dissolving the sample, it was filtered with 0.45 μm syringe filter and then installed to MALS autosampler.

(3) Analysis Method

Injection volume: 400 μl
Injection Temp.: 50° C.
Flow Rate: 1 ml/min
Eluent: DMF (containing 0.05% LiCl, Refractive index 1.405)
Column Temp.: 50° C
Dn/Dc: see the following description.

At this time, Dn/Dc relates to the specific refractive index increment, and is the value that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer. Specifically, the above value was measured as the following method.

(4) Analysis Apparatus that is used for Measuring Dn/Dc
RI Detector: Wyatt Optilavb rEX (5) Pretreatment Method of Sample for Measuring Dn/Dc Firstly, 0.2 g of the polyimide films that were obtained from the above Example 5 to Example 12 were dissolved in 50 ml of DMF (containing 0.05% LiCl) to prepare a sample. At this time, because it was not easily dissolved, it was added to an oven of 50° C., and dissolved for about 2 hours while shaking. The samples having 0.0032 g/ml, 0.0024 g/ml, 0.0016 g/ml and 0.0008 g/ml concentration, respectively were prepared by diluting the sample having a high concentration. The refractive index values according to the concentration were measured using 0.45 μm syringe filter.

(6) Analysis Method of Dn/Dc Sample injection volume: 10 ml
injector Temp.: 50° C.
flow rate: 16 ml/hr
eluent: DMF (Refractive index 1.405)

As the results obtained from the above analysis, in the case of the polyimide films that were obtained from the above Example 5 to Example 12, Dn/Dc value was 0.1216 at 50° C. of DMF.

The absolute molecular weight value according to MALS can be calculated according to the above method from Dn/Dc value that was obtained. The results were shown in the following Table 2.

Above this, the transmittance, a color coordinate, a degree of yellowness and the coefficient of linear thermal expansion were measured using the following methods, and then the results were shown in the following Table 3.

(7) Transmittance and Color Coordinate

The visible ray transmittances of the prepared films were measured using UV spectrophotometer (available from Varian Company, Cary 100).

In addition, the color coordinates of the prepared films were measured according to ASTM E 1347-06 standard using UV spectrophotometer (available from Varian Company, Cary 100), and an illuminant was based on the measurement value according to CIE D65.

(8) Degree of Yellowness

The degree of yellowness was measured in ASTM E313 standard.

(9) Coefficient of Linear Thermal Expansion (CTE)

The mean coefficient of linear thermal expansion was measured at 50~250° C. according to TMA-Method using TMA (available from TA Instrument company, Q400).

TABLE 2

|  | Dn/Dc | Mn (g/mol) | Mp (g/mol) | Mw (g/mol) | Mz (g/mol) | Rz (nm) | Polydispesity |
|---|---|---|---|---|---|---|---|
| Example 5 | 0.1216 | $1.454 \times 10^4$ | $1.606 \times 10^4$ | $1.734 \times 10^4$ | $2.052 \times 10^4$ | 1.6 | 1.192 |
| Example 6 | 0.1216 | $2.610 \times 10^4$ | $3.096 \times 10^4$ | $3.128 \times 10^4$ | $4.039 \times 10^4$ | 17.2 | 1.198 |
| Example 7 | 0.1216 | $4.995 \times 10^4$ | $6.967 \times 10^4$ | $6.190 \times 10^4$ | $7.972 \times 10^4$ | 17.3 | 1.213 |
| Example 8 | 0.1216 | $3.711 \times 10^4$ | $4.871 \times 10^4$ | $4.642 \times 10^4$ | $4.642 \times 10^4$ | 21.9 | 1.251 |
| Example 9 | 0.1216 | $3.730 \times 10^4$ | $4.510 \times 10^4$ | $4.552 \times 10^4$ | $5.890 \times 10^4$ | 20.1 | 1.220 |
| Example 10 | 0.1216 | $1.071 \times 10^5$ | $1.334 \times 10^5$ | $1.278 \times 10^5$ | $1.625 \times 10^5$ | 23.6 | 1.193 |

TABLE 2-continued

|  | Dn/Dc | Mn (g/mol) | Mp (g/mol) | Mw (g/mol) | Mz (g/mol) | Rz (nm) | Polydispesity |
|---|---|---|---|---|---|---|---|
| Example 11 | 0.1216 | $7.743 \times 10^4$ | $1.004 \times 10^5$ | $9.234 \times 10^4$ | $1.396 \times 10^5$ | 20.1 | 1.193 |
| Example 12 | 0.1216 | $3.868 \times 10^4$ | $7.050 \times 10^4$ | $5.877 \times 10^4$ | $8.011 \times 10^4$ | 3.3 | 1.520 |

TABLE 3

|  |  | Thickness | CTE* |  | Transmittance (%) |  |  |  |  | Color Coordinate |  |  |
|---|---|---|---|---|---|---|---|---|---|---|---|---|
|  |  | (μm) | (ppm/° C.) | Y** | 400 nm~740 nm | 550 nm~740 nm | 550 nm | 500 nm | 4200 nm | L | a | b |
| Ex. | 5 | 100 | — | 5.12 | 85.3 | 87.5 | 88.6 | 87.9 | 77.1 | 96.11 | −0.95 | 3.03 |
|  | 6 | 100 | 53.6 | 3.97 | 87.8 | 90.9 | 90.4 | 89.6 | 80.0 | 96.08 | −0.87 | 2.98 |
|  | 7 | 100 | 48.8 | 2.94 | 87.9 | 90.5 | 90.0 | 89.3 | 82.1 | 95.92 | −0.59 | 2.25 |
|  | 8 | 100 | 44.2 | 2.78 | 87.9 | 90.4 | 89.9 | 89.3 | 82.5 | 95.9 | −0.58 | 2.13 |
|  | 9 | 100 | 52.2 | 4.39 | 87.7 | 90.8 | 90.3 | 89.3 | 79.5 | 96.0 | −0.90 | 3.23 |
|  | 10 | 100 | 47.9 | 2.96 | 88.0 | 90.7 | 90.3 | 89.5 | 82.1 | 96.0 | −0.62 | 2.28 |
|  | 11 | 100 | 51.2 | 2.85 | 88.0 | 90.6 | 90.2 | 89.5 | 82.2 | 96.0 | −0.61 | 2.2 |
|  | 12 | 100 | 54.3 | 3.55 | 87.7 | 90.3 | 90.1 | 89.5 | 80.6 | 96.0 | −0.88 | 2.3 |

*Coefficient of Linear Thermal Expansion
**Degree of Yellowness

From the results of the above Table 3, the polyimide film according to the present invention has an excellent transparency and also an excellent dimensional stability about a thermal stress.

EXAMPLE 13

While a nitrogen was passing through 1 L reactor comprising a stirrer, a nitrogen injector, a dropping funnel, a thermostat and a cooler as a reactor, 605.6 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 5.8844 g (0.02 mol) of BPDA was added and stirred for 1 hour to completely dissolve BPDA. At this time, the temperature of the solution was maintained at 25° C. And, 79.97 g (0.18 mol) of 6FDA was added and then the solution of the polyamic acid having the solid concentration of 20 wt % was obtained.

The solution of the polyamic acid was stirred at a room temperature for 12 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 147 g of the solid powder (the degree of imidization was 80.5%).

The solid powder obtained from the above method was dissolved in 588 g of N,N-dimethylacetamide (DMAc) to obtain 20 wt % of the solution (viscosity: 70 poise).

After finishing the reaction, the obtained solution was applied to a stainless board and then cast in 700 μm; after drying for 1 hour with a hot-air of 150° C., the film was detached from the stainless board and then fixed in a frame with a pin.

After the frame fixed with the film was added to the vacuum oven and slowly heated for 2 hours from 100° C. to 300° C., it was slowly cooled to remove from the frame to obtain the polyimide film. And then, it was again heated for 30 minutes at 300° C. to obtain the polyimide film as the final heating (thickness: 100 μm, and the degree of imidization: 99.8%).

The data about the polymer was collected using the following method about the polyimide films.

(1) Apparatus and Method for Analyzing

GPC & MALS Analysis Apparatus: GPC—Water 1525 Binary HPLC pump; RI detector—Wyatt optilab rEX; MALS—Wyatt Dawn 8+; Column—use by connecting with Shodex K-803, K-804 and K-805

(2) Pretreatment Method of Sample 0.05 g of the films that were obtained were weighted and added in 10 ml vial of DMF (containing 0.05% LiCl). The solutions of DMF containing the films were added to an oven of 50° C. and dissolved for 2 hours while shaking. After completely dissolving the sample, it was filtered with 0.45 μm syringe filter and then installed to MALS autosampler.

(3) Analysis Method

Injection volume: 400 μl

Injection Temp.: 50° C.

Flow Rate: 1 ml/min

Eluent: DMF (containing 0.05% LiCl, Refractive index 1.390)

Column Temp.: 50° C.

Dn/Dc: see the following description

At this time, Dn/Dc relates to the specific refractive index increment, and is the value that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer. Specifically, the above value was measured as the following method.

(4) Analysis Apparatus that is used for Measuring Dn/Dc

RI Detector: Wyatt Optilavb rEX (4) Pretreatment Method of Sample for Measuring Dn/Dc Firstly, 0.2 g of the polyimide films that were obtained were dissolved in 50 ml of DMF (containing 0.05% LiCl) to prepare a sample having a high concentration. At this time, because it was not easily dissolved, it was added to an oven of 50° C., and dissolved for about 2 hours while shaking. The samples having 0.0032 g/ml, 0.0024 g/ml, 0.0016 g/ml and 0.0008 g/ml concentration, respectively were prepared by diluting the sample having a high concentration. The refractive index values according to the concentration were measured using 0.45 μm syringe filter.

(6) Analysis Method of Dn/Dc Sample
injection volume: 10 ml
injector Temp.: 50° C.
flow rate: 16 ml/hr
eluent: DMF (containing 0.05% LiCl, Refractive index 1.390)

As the results obtained from the above analysis, in the case of the polyimide films that were obtained, Dn/Dc value was 0.1348±0.0010 at 50° C. of DMF (containing 0.05% LiCl).

The absolute molecular weight value according to MALS can be calculated according to the above method from Dn/Dc value that was obtained. The results were shown in the following Table 4.

EXAMPLE 14 TO EXAMPLE 16

The film was prepared using the same method to the above Example 13, but the mole % of BPDA to TFDB was changed when preparing the solution of the polyamic acid as the following Table 4.

The absolute molecular weight value according to MALS and Dn/Dc value about the obtained films can be calculated using the same method to Example 13 according to the above method from Dn/Dc value that was obtained. The results were shown in the following Table 4.

However, Example 14 used the different processing after polymerizing the polyamic acid as follows: after finishing the reaction, the obtained solution was applied to a stainless board and then cast in 700 μm; after drying for 1 hour with a hot-air of 80° C., the film was detached from the stainless board and then fixed in a frame with a pin.

After the frame fixed with the film was added to the vacuum oven and slowly heated for 2 hours from 80° C. to 300° C., it was slowly cooled to remove from the frame to obtain the polyimide film. And then, it was again heated for 30 minutes at 300° C. to obtain the polyimide film as the final heating (thickness: 100 μm, and the degree of imidization: 95%).

TABLE 4

|  | TFDB to BPDA mol % | Dn/Dc | Mn (g/mol) | Mp (g/mol) | Mw (g/mol) | Mz (g/mol) | Rz (nm) | Polydispesity |
|---|---|---|---|---|---|---|---|---|
| Ex. 13 | 10 | 0.1158 ± 0.0006 | $5.394 \times 10^4$ | $5.865 \times 10^4$ | $7.907 \times 10^4$ | $1.185 \times 10^5$ | 26.5 | 1.466 |
| Ex. 14 | 20 | 0.1246 ± 0.0012 | $8.740 \times 10^4$ | $1.020 \times 10^5$ | $1.085 \times 10^5$ | $1.472 \times 10^5$ | 20.1 | 1.241 |
| Ex. 15 | 40 | 0.1284 ± 0.0007 | $8.458 \times 10^4$ | $9.391 \times 10^4$ | $1.016 \times 10^5$ | $1.425 \times 10^5$ | 21.9 | 1.202 |
| Ex. 16 | 50 | 0.1390 ± 0.0002 | $8.769 \times 10^4$ | $9.258 \times 10^4$ | $1.037 \times 10^5$ | $1.433 \times 10^5$ | 21.3 | 1.183 |

From the results of the above Table 4, Dn/Dc was also shown to be increased that is depended on the increase of BPDA content.

For the films obtained from the above Example 13 to 16, the degree of yellowness was measured based on ASTM E313 standard and then the results were shown in the following Table 5.

TABLE 5

|  | Degree of Yellowness | Mean Transmittance |
|---|---|---|
| Example 13 | 1.6522 | 90.08 |
| Example 14 | 3.10 | 90.08 |

TABLE 5-continued

|  | Degree of Yellowness | Mean Transmittance |
|---|---|---|
| Example 15 | 3.07 | 90.06 |
| Example 16 | 3.40 | 89.50 |

From the above results of Table 5, it could be shown that the mean transmittance was decreased while the degree of yellowness was becoming large according to the increase of Dn/Dc value.

MEASUREMENT EXAMPLE

The data about the polymer was collected about the polyimide films that were obtained from the above Example 5 to Example 8, Example 10 and Example 11 using the following method.

(1) Apparatus and Method for Analyzing
GPC & MALS Analysis Apparatus: GPC—Water 1525 Binary HPLC pump; RI detector—Wyatt optilab rEX; MALS—Wyatt Dawn 8+; Column—use by connecting with Shodex K-803, K-804 and K-805

(2) Pretreatment Method of Sample
0.05 g of the films that were obtained were weighted and added in 10 ml vial of DMF (containing 0.05% LiCl). The solutions of DMF containing the films were added to an oven of 50° C. and dissolved for 2 hours while shaking. After completely dissolving the sample, it was filtered with 0.45 μm syringe filter and then installed to MALS autosampler.

(3) Analysis Method
Injection volume: 400 μl
Injection Temp.: 50° C.
Flow Rate: 1 ml/min
Eluent: DMF (containing 0.05% LiCl, Refractive index 1.390)
Column Temp.: 50° C.
Dn/Dc: see the following description At this time, Dn/Dc relates to the specific refractive index increment, and is the value that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer. Specifically, the above value was measured as the following method.

(4) Analysis Apparatus that is used for Measuring Dn/Dc
RI Detector: Wyatt Optilavb rEX (5) Pretreatment Method of Sample for Measuring Dn/Dc
Firstly, 0.2 g of the polyimide films that were obtained were dissolved in 50 ml of DMF (containing 0.05% LiCl) to prepare a sample having a high concentration. At this time, because it was not easily dissolved, it was added to an oven of 50° C., and dissolved for about 2 hours while shaking. The samples having 0.0032 g/ml, 0.0024 g/ml 0.0016 g/ml and 0.0008 g/ml concentration, respectively were prepared by diluting the sample having a high concentration. For each sample, the refractive index values according to the concentration were measured using 0.45 µm syringe filter.

(6) Analysis Method of Dn/Dc Sample
injection volume: 10 ml
injector Temp.: 50° C.
flow rate: 16 ml/hr
eluent: DMF (containing 0.05% LiCl, Refractive index 1.390)

As the results obtained from the above analysis, in the case of the polyimide films that were obtained, Dn/Dc value was 0.1246±0.0012 at 50° C. of DMF (containing 0.05% LiCl).

The absolute molecular weight value according to MALS can be calculated according to the above method from Dn/Dc value that was obtained. The results were shown in the following Table 6.

TABLE 6

|        | Dn/Dc            | Mn (g/mol)         | Mp (g/mol)         | Mw (g/mol)         | Mz (g/mol)         | Rz (nm) | Polydispesity |
|--------|------------------|--------------------|--------------------|--------------------|--------------------|---------|---------------|
| Ex. 5  | 0.1246 ± 0.0012  | $1.249 \times 10^4$ | $1.709 \times 10^4$ | $1.845 \times 10^4$ | $4.716 \times 10^4$ | —       | 1.478         |
| Ex. 6  | 0.1246 ± 0.0012  | $2.556 \times 10^4$ | $2.929 \times 10^4$ | $3.290 \times 10^4$ | $3.133 \times 10^5$ | 34.7    | 1.287         |
| Ex. 7  | 0.1246 ± 0.0012  | $4.767 \times 10^4$ | $5.785 \times 10^4$ | $5.942 \times 10^4$ | $1.145 \times 10^5$ | 25      | 1.246         |
| Ex. 8  | 0.1246 ± 0.0012  | $3.430 \times 10^4$ | $4.524 \times 10^4$ | $4.493 \times 10^4$ | $8.112 \times 10^4$ | 22.6    | 1.310         |
| Ex. 10 | 0.1246 ± 0.0012  | $9.427 \times 10^4$ | $1.098 \times 10^5$ | $1.162 \times 10^5$ | $1.575 \times 10^5$ | 25.2    | 1.232         |
| Ex. 11 | 0.1246 ± 0.0012  | $7.268 \times 10^4$ | $8.199 \times 10^4$ | $8.805 \times 10^4$ | $1.199 \times 10^5$ | 19.5    | 1.212         |

The invention claimed is:

1. A polyimide powder that is an imide of polyamic acid obtained by polymerizing a diamine and at least two acid dianhydrides, wherein a degree of imidization of the polyimide powder is not less than 80%; a specific refractive index increment (dn/dc) of the polyimide powder is 0.100 to 0.1800; and the acid dianhydrides comprise 2,2-bis(3,4-dicarboxyphenyl)hexafluoropropane dianhydride, and at least one selected from the group consisting of 4-(2,5-dioxotetrahydrofuran-3)-1,2,3,4-tetrahydronaphtalene-1,2-dicarboxylic anhydride and 4,4'-(4,4'-isopropylidenediphenoxy)bis(phthalic anhydride);

wherein the imide of the polyamic acid is obtained by lastly injecting the 2,2-bis(3,4-dicarboxyphenyl)hexafluoropropane dianhydride during the polymerization of the diamine and the acid dianhydrides; and wherein the specific refractive index increment (dn/dc) is defined as follows:

Specific refractive index increment (dn/dc): the value is that a change rate of refractive index according to the change rate of dilute solution concentration is differentiated and is measured within the range of 0.001 to 0.1 g/ml that is a section of concentration change when detecting a refractive index through injecting the polyimide powder in a state of dilute solution in an organic solvent inside flow cell of differential refractometer.

2. The polyimide powder according to claim 1, wherein the specific refractive index increment (dn/dc) is 0.100 to 0.1300.

3. The polyimide powder according to claim 1, wherein 2,2-bis(3,4-dicarboxyphenyl)hexafluoropropane dianhydride is included in 30 mol % to 80 mol % based on the total amount of the acid dianhydrides.

4. The polyimide powder according to claim 1, wherein the diamine includes 2,2'-bis(trifluoromethyl)-4,4'-diaminobiphenyl.

5. The polyimide powder according to claim 4, wherein 2,2'-bis(trifluoromethyl)-4,4'-diaminobiphenyl is included in 20 mol % to 100 mol % based on the total amount of the diamine.

6. The polyimide powder according to claim 1, wherein the polymerization is performed for 5 to 24 hours.

7. The polyimide powder according to claim 6, wherein the polymerization is performed for 8 to 12 hours.

8. A method for producing a polyimide powder, comprising:

obtaining a solution of a polyamic acid by polymerizing a diamine and at least two acid dianhydrides in an organic solvent;

preparing a solution containing an imide that is imidized in an imidization degree of not less than 80% by injecting a chemical converting agent to the solution of the polyamic acid;

precipitating by adding a solvent selected from the group consisting of water, methyl alcohol, ethyl alcohol, isopropyl alcohol, ethylene glycol, triethylene glycol, 2-butyl alcohol, 2-propyl alcohol, 2-hexyl alcohol, cyclophentyl alcohol, cyclohexyl alcohol, phenol and t-butyl alcohol to the solution containing the imide; and filtering of the solids that are precipitated;

wherein the specific refractive index increment (dn/dc) is defined as follows is 0.100 to 0.1800:

Specific refractive index increment (dn/dc): the value is that a change rate of refractive index according to the change rate of dilute solution concentration is differentiated and is measured within the range of 0.001 to 0.1 g/ml that is a section of concentration change when detecting a refractive index through injecting the polyimide powder in a state of dilute solution in an organic solvent inside flow cell of differential refractometer;

wherein the acid dianhydrides comprise 2,2-bis(3,4-dicarboxyphenyl)hexafluoropropane dianhydride, and at least one selected from the group consisting of 4-(2,5-dioxotetrahydrofuran-3)-1,2,3,4-tetrahydronaphtalene-1,2-dicarboxylic anhydride and 4,4'-(4,4'-isopropylidenediphenoxy)bis(phthalic anhydride); and wherein the imide of the polyamic acid is obtained by lastly injecting the 2,2-bis(3,4-dicarboxyphenyl)hexafluoropropane dianhydride during the polymerization of the diamine and the acid dianhydrides.

9. A polyimide film that is obtained by casting an imide of a polyamic acid that is obtained by polymerizing a diamine and at least two acid dianhydrides, wherein a specific refractive index increment (dn/dc) that is defined as follows is 0.100 to 0.1800:

Specific refractive index increment (dn/dc): the value is that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer;

wherein the acid dianhydrides comprise 2,2-bis(3,4-dicarboxyphenyl)hexafluoropropane dianhydride, and at least one selected from the group consisting of 4-(2,5-dioxotetrahydrofuran-3)-1,2,3,4-tetrahydronaphtalene-1,2-dicarboxylic anhydride and 4,4'-(4,4'-isopropylidenediphenoxy)bis(phthalic anhydride); and wherein the imide of the polyamic acid is obtained by lastly injecting the 2,2-bis(3,4-dicarboxyphenyl)hexafluoropropane dianhydride during the polymerization of the diamine and the acid dianhydrides.

10. The polyimide film according to claim 9, wherein the specific refractive index increment (dn/dc) is 0.100 to 0.1300.

11. The polyimide film according to claim 9, wherein 2,2-bis(3,4-dicarboxyphenyl)hexafluoropropane dianhydride is included in 30 mol % to 80 mol % based on the total amount of the acid dianhydrides.

12. The polyimide film according to claim 9, wherein the diamine includes 2,2'-bis(trifluoromethyl)-4,4'-diaminobiphenyl.

13. The polyimide film according to claim 12, wherein 2,2'-bis(trifluoromethyl)-4,4'-diaminobiphenyl is included in 20 mol % to 100 mol % based on the total amount of the diamine.

14. The polyimide film according to claim 9, wherein the polymerization is performed for 1 to 24 hours.

15. The polyimide film according to claim 14, wherein the polymerization is performed for 8 to 12 hours.

16. The polyimide film according to claim 9, wherein a degree of yellowness is not more than 4.5 based on a film thickness of 50~100 μm.

17. The polyimide film according to claim 9, wherein a mean coefficient of linear thermal expansion (CTE) is not more than 70 ppm/° C., in which the mean coefficient of linear thermal expansion (CTE) is measured within the range of 50 to 250° C. using a thermomechanical analysis based on a film thickness of 50~100 μm.

18. A method for producing a polyimide film, comprising:

obtaining a solution of a polyamic acid by polymerizing a diamine and at least two acid dianhydrides in an organic solvent;

preparing a solution containing an imide that is imidized in an imidization degree of not less than 80% by injecting a chemical converting agent to the solution of the polyamic acid;

precipitating by adding a solvent selected from the group consisting of water, methyl alcohol, ethyl alcohol, isopropyl alcohol, ethylene glycol, triethylene glycol, 2-butyl alcohol, 2-propyl alcohol, 2-hexyl alcohol, cyclophentyl alcohol, cyclohexyl alcohol, phenol and t-butyl alcohol to the solution containing the imide; and filtering of the solids that are precipitated;

wherein the specific refractive index increment (dn/dc) is defined as follows is 0.100 to 0.1800:

Specific refractive index increment (dn/dc): the value is that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer;

wherein the acid dianhydrides comprise 2,2-bis(3,4-dicarboxyphenyl)hexafluoropropane dianhydride, and at least one selected from the group consisting of 4-(2,5-dioxotetrahydrofuran-3)-1,2,3,4-tetrahydronaphtalene-1,2-dicarboxylic anhydride and 4,4'-(4,4'-isopropylidenediphenoxy)bis(phthalic anhydride); and wherein the imide of the polyamic acid is obtained by lastly injecting the 2,2-bis(3,4-dicarboxyphenyl)hexafluoropropane dianhydride during the polymerization of the diamine and the acid dianhydrides.

19. The method according to claim 18, wherein the specific refractive index increment (dn/dc) is 0.100 to 0.1300.

20. The method according to claim 18, wherein the chemical converting agent includes a dehydrating agent and catalyst.

* * * * *